(No Model.)

J. FLATHER.
ADJUSTABLE STOP FOR TAPER TURNING LATHES.

No. 520,918. Patented June 5, 1894.

Witnesses.
W. J. Elliott.
M. A. Taylor.

Inventor.
Joseph Flather
by
Richard P. Elliott
Attorney.

UNITED STATES PATENT OFFICE.

JOSEPH FLATHER, OF NASHUA, NEW HAMPSHIRE.

ADJUSTABLE STOP FOR TAPER-TURNING LATHES.

SPECIFICATION forming part of Letters Patent No. 520,918, dated June 5, 1894.

Application filed April 9, 1894. Serial No. 506,915. (No model.)

*To all whom it may concern:*

Be it known that I, JOSEPH FLATHER, of Nashua, in the county of Hillsborough and State of New Hampshire, have invented certain new and useful Improvements in Adjustable Stops for Taper-Turning Lathes, of which the following is a specification.

My invention relates to an adjustable stop to be used in connection with the taper attachment shown in patent granted to me November 21, 1893, No. 509,212.

The object of my improvement is to provide means whereby the backlash consequent upon the wear of cross-feed screw and nut secured to the tool-block in which the cross-feed screw has a threaded bearing may be overcome, also to overcome the end wear of bearing in slide-block in which the end of cross-feed screw revolves. In practice I find that the back-lash in cross-feed screw seriously impairs the truth of the taper turned in a lathe having a taper attachment unless the tool-block can be rigidly connected by suitable means with the slide-block on slide bar. In turning a taper the point of the tool should travel in a right line from the commencement of the cut until the finish, but by experiment I find that if there is a hard or soft spot in the metal operated upon, the tool is either deflected outward or drawn into the work operated upon, thereby impairing the truth of the taper being turned. All of which is obviated by the device herein shown.

Figure 1:
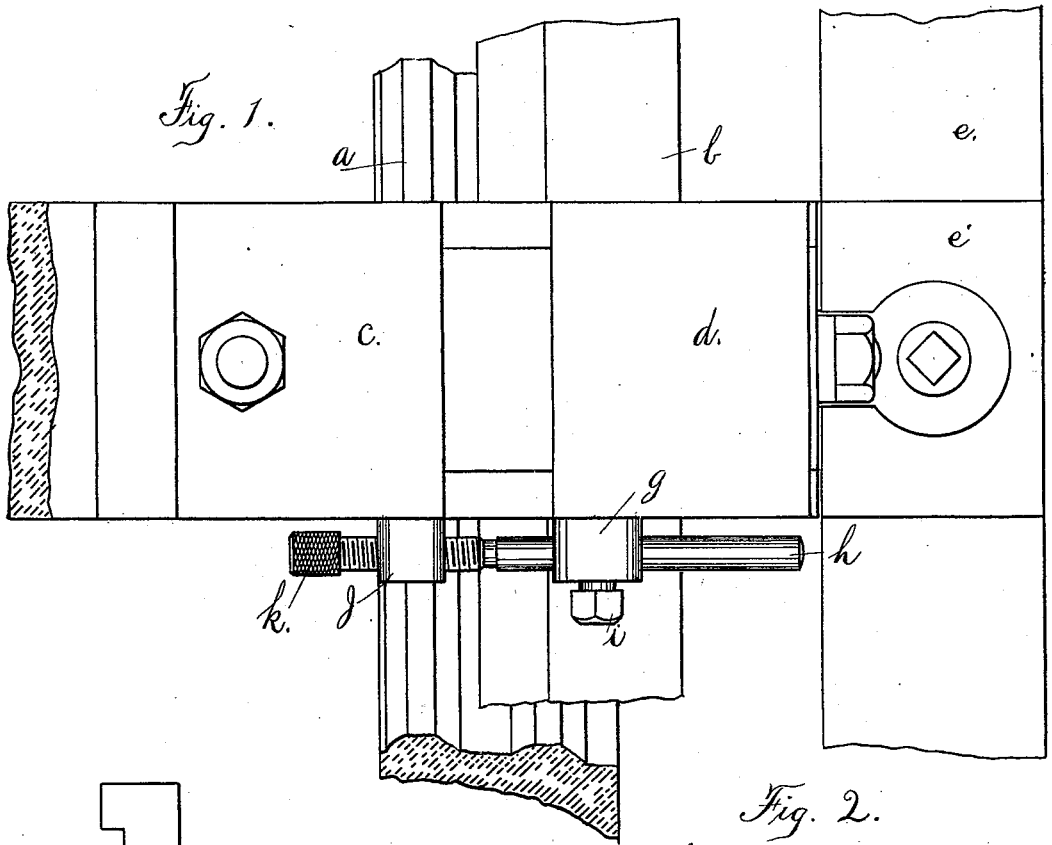
Figure 2:
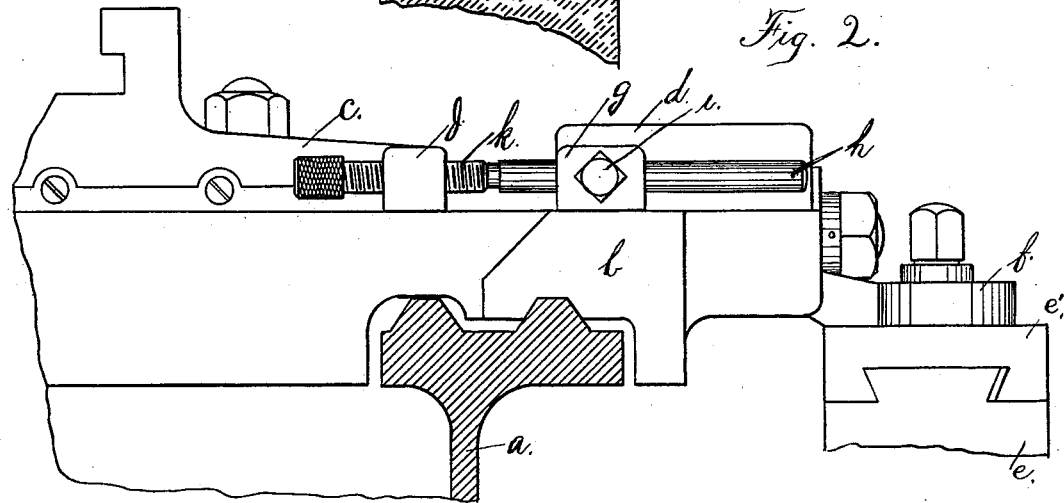

In the drawings which accompany and form a part of this specification:—Figure 1, represents a plan of a section of lathe bed, tool carriage, tool-block, slide bar of taper attachment, and the slide blocks on tool carriage and slide bar, with my adjustable stop attached. Fig. 2, is an elevation of the same.

*a—*, designates a section of the lathe bed. *b—*, the tool carriage on ways thereon. *c—*, the tool-block which slides on ways on top of said carriage, the movement of which is controlled by the cross-feed screw which is not shown.

*d—*, is a slide which operates on ways of tool carriage, and has a bearing in which one end of cross-feed screw revolves.

*e—*, is the slide bar of taper attachment, the top of which is provided with ways on which the slide-block *e'—*, has a free longitudinal movement.

*f—*, is the connection between the slide *e'—*, and the slide-block *d—*.

*g—*, is a lug on the side of slide-block *d—*, provided with a hole through which the rod *h—*, passes loosely, said rod *h—*, is frictionally held in the desired position by the set screw *i—*.

*j—*, is a lug on the side of tool-block *c—*, and is in alignment with the lug *g—*, and has a threaded hole in alignment with hole in lug *g—*, through which the adjusting screw *k—*, passes, said screw *k—*, has a milled head so as to be operated by the fingers of the operator.

The operation of my improved device is as follows:—After placing the work between the centers of the lathe, the tool is moved to the surface of the work to be operated upon, then the set screw *i—*, is loosened and rod *h—*, moved until end comes in contact with end of screw *k—*, after which the depth of cut is adjusted by the said screw *k—*, when the tool has been set to the required depth of cut the feed-screw is turned or revolved until point of screw *k—*, is pressed firmly against the end of rod *h—*, thereby insuring a rigid connection between tool-block *c—*, and slide *e'—*, which prevents any deflection of the point of tool from a right line while in operation.

I do not limit myself to the precise form of lugs and adjusting screw herein shown, as they may be somewhat changed without departing from the spirit of my invention.

What I claim is—

The combination in a metal turning lathe, of a taper attachment having a slide bar, a slide thereon connected with a slide-block operating on ways on tool carriage, a lug on the side of said slide block, a rod passing through a hole in said lug, a set screw to frictionally hold said rod in any desired position, a tool block provided with a lug on its side in alignment with the lug on slide block, and a screw operating in a threaded hole in said lug so that its point will come in contact with one end of said rod, all as and for the purpose specified.

In testimony whereof I have signed my name to this specification, in the presence of two subscribing witnesses, this 3d day of April, A. D. 1894.

JOSEPH FLATHER.

Witnesses:
R. P. ELLIOTT,
W. A. CUMMINGS.